(12) United States Patent  (10) Patent No.: US 8,441,513 B2
Sakai  (45) Date of Patent: May 14, 2013

(54) LIGHT SOURCE DEVICE AND IMAGE FORMING APPARATUS

(75) Inventor: Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 303 days.

(21) Appl. No.: 12/881,348

(22) Filed: Sep. 14, 2010

(65) Prior Publication Data

US 2011/0063594 A1 Mar. 17, 2011

(30) Foreign Application Priority Data

Sep. 15, 2009 (JP) ................................. 2009-212706

(51) Int. Cl.
*B41J 27/00* (2006.01)
*B41J 2/435* (2006.01)

(52) U.S. Cl.
USPC ............ 347/258; 347/241; 347/256; 347/263

(58) Field of Classification Search .................. 347/256, 347/263, 241, 258
See application file for complete search history.

(56) References Cited

U.S. PATENT DOCUMENTS

| | | | |
|---|---|---|---|
| 5,831,758 A | 11/1998 | Sakai et al. | |
| 5,999,345 A | 12/1999 | Nakajima et al. | |
| 6,166,842 A | 12/2000 | Aoki et al. | |
| 6,256,133 B1 | 7/2001 | Suzuki et al. | |
| 6,347,004 B1 | 2/2002 | Suzuki et al. | |
| 6,366,384 B1 | 4/2002 | Aoki et al. | |
| 6,388,792 B1 | 5/2002 | Atsuumi et al. | |
| 6,448,998 B1 | 9/2002 | Suzuki et al. | |
| 6,462,853 B2 * | 10/2002 | Hayashi | 359/205.1 |
| 6,509,995 B1 | 1/2003 | Suzuki et al. | |
| 6,596,985 B2 | 7/2003 | Sakai et al. | |
| 6,607,309 B2 * | 8/2003 | Kuhn et al. | 385/93 |
| 6,771,407 B2 | 8/2004 | Hayashi et al. | |
| 6,781,729 B2 | 8/2004 | Suzuki et al. | |
| 6,856,438 B2 | 2/2005 | Takanashi et al. | |
| 6,999,208 B2 | 2/2006 | Suzuki et al. | |
| 7,006,120 B2 | 2/2006 | Sakai et al. | |
| 7,034,973 B2 | 4/2006 | Sakai | |
| 7,038,822 B2 | 5/2006 | Sakai et al. | |
| 7,215,354 B1 | 5/2007 | Sakai et al. | |
| 7,253,937 B2 | 8/2007 | Ueda et al. | |
| 7,330,296 B2 | 2/2008 | Sakai | |
| 7,362,486 B2 | 4/2008 | Hayashi et al. | |
| 7,411,712 B2 | 8/2008 | Nakajima et al. | |

(Continued)

FOREIGN PATENT DOCUMENTS

| | | |
|---|---|---|
| JP | 2001-267681 | 9/2001 |
| JP | 2006-332142 | 12/2006 |
| JP | 2008-213246 | 9/2008 |

*Primary Examiner* — Stephen Meier
*Assistant Examiner* — Sarah Al Hashimi
(74) *Attorney, Agent, or Firm* — Cooper & Dunham LLP

(57) ABSTRACT

A light source device includes a surface emitting laser, a surface emitting laser holding unit on which the surface emitting laser is mounted, a parallel plate that is arranged on a light path of a light flux from the surface emitting laser so that the light flux enters into one surface thereof, and that is made of a transparent material, and a holder having a through hole that functions as a light path of the light flux from the surface emitting laser, wherein the surface emitting laser holding unit is brought into contact with the holder, the parallel plate is fixedly bonded to the holder, and a part of the through hole of the holder is sealed with the surface emitting laser holding unit and the parallel plate.

11 Claims, 17 Drawing Sheets

U.S. PATENT DOCUMENTS

| | | |
|---|---|---|
| 7,417,777 B2 | 8/2008 | Saisho et al. |
| 7,443,558 B2 | 10/2008 | Sakai et al. |
| 7,616,364 B2 | 11/2009 | Saisho et al. |
| 7,663,657 B2 | 2/2010 | Ichii et al. |
| 7,672,032 B2 | 3/2010 | Hayashi et al. |
| 7,688,491 B2 | 3/2010 | Saisho et al. |
| 7,701,480 B2 | 4/2010 | Omori et al. |
| 2006/0209168 A1* | 9/2006 | Shiraishi ................. 347/233 |
| 2007/0146473 A1* | 6/2007 | Masuda ................. 347/246 |
| 2007/0211326 A1 | 9/2007 | Saisho et al. |
| 2007/0253048 A1 | 11/2007 | Sakai et al. |
| 2008/0062491 A1* | 3/2008 | Nakamura et al. ............ 359/200 |
| 2009/0059333 A1 | 3/2009 | Sakai |
| 2009/0225146 A1* | 9/2009 | Yoshimaru ................. 347/111 |
| 2010/0194843 A1 | 8/2010 | Sakai et al. |

* cited by examiner

SAMPLE a

SAMPLE a

LIGHT SOURCE DEVICE AND IMAGE FORMING APPARATUS

CROSS-REFERENCE TO RELATED APPLICATIONS

The present application claims priority to and incorporates by reference the entire contents of Japanese Patent Application No. 2009-212706 filed in Japan on Sep. 15, 2009.

BACKGROUND OF THE INVENTION

1. Field of the Invention

The present invention relates to a light source device and an image forming apparatus.

2. Description of the Related Art

In recent years, in an image forming apparatus such as a laser printer and a digital copying machine, there is an increasing demand for high-speed and high-density printing. As one measure for meeting the demand, a technology has been proposed in which an optical scanning device that includes a light source having a plurality of light emitting units is used to scan a scanning surface with a plurality of light fluxes.

A semiconductor laser is generally employed as a light source, and recently, a vertical cavity surface emitting laser (hereinafter, "VCSEL") has been used in addition to an edge emitting semiconductor laser that was used more commonly.

The VCSEL light source is generally constructed of a VCSEL element and a package on which the VCSEL element is mounted. The VCSEL element is sealed in by using a lid (a package lid) made of a translucent material such as a glass or a sapphire in order to ensure environmental resistance (protection against dust or dirt) (see, for example, Japanese Patent Application Laid-open No. 2001-267681).

However, the package lid reflects a light even though it has a high translucency. Furthermore, a distance between the VCSEL element and the package lid is so close that when image formation is performed by using the VCSEL light source, the reflected light from the package lid returns to the VCSEL, resulting in what is called optical feedback which causes negative impact.

SUMMARY OF THE INVENTION

It is an object of the present invention to at least partially solve the problems in the conventional technology.

According to one aspect of the present invention, a light source device includes a surface emitting laser, a surface emitting laser holding unit on which the surface emitting laser is mounted, a parallel plate that is arranged on a light path of a light flux from the surface emitting laser so that the light flux enters into one surface thereof, and that is made of a transparent material, and a holder having a through hole that functions as a light path of the light flux from the surface emitting laser, wherein the surface emitting laser holding unit is brought into contact with the holder, the parallel plate is fixedly bonded to the holder, and a part of the through hole of the holder is sealed with the surface emitting laser holding unit and the parallel plate.

According to another aspect of the present invention, an image forming apparatus includes at least one image carrier, and at least one optical scanning device that scans a scanning surface with a light flux, the optical scanning device comprising a light source device including a surface emitting laser, a surface emitting laser holding unit on which the surface emitting laser is mounted, a parallel plate that is arranged on a light path of a light flux from the surface emitting laser so that the light flux enters into one surface thereof, and that is made of a transparent material, and a holder having a through hole that functions as a light path of the light flux from the surface emitting laser, the surface emitting laser holding unit being brought into contact with the holder, the parallel plate being fixedly bonded to the holder, and a part of the through hole of the holder being sealed with the surface emitting laser holding unit and the parallel plate, a deflector that deflects the light flux emitted from the light source device, and a scanning optical system that focuses the light flux deflected by the deflector onto the scanning surface, wherein the optical scanning device scans the image carrier with a light flux modulated based on image information.

According to still another aspect of the present invention, a light source device includes a surface emitting laser, a surface emitting laser holding unit on which the surface emitting laser is mounted, a quarter-wave plate that is arranged on a light path of a light flux from the surface emitting laser so that the light flux enters one surface thereof, and a holder having a through hole that functions as a light path of the light flux from the surface emitting laser, wherein the surface emitting laser holding unit is brought into contact with the holder, the quarter-wave plate is fixedly bonded to the holder, and a part of the through hole of the holder is sealed with the surface emitting laser holding unit and the quarter-wave plate.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a diagram for explaining temperature characteristics of D in a sample a;

FIG. 14 is a diagram for explaining a relationship between P3/P2 and the intensity of an emitted light in the sample a;

DETAILED DESCRIPTION OF THE PREFERRED EMBODIMENTS

Figure 1:
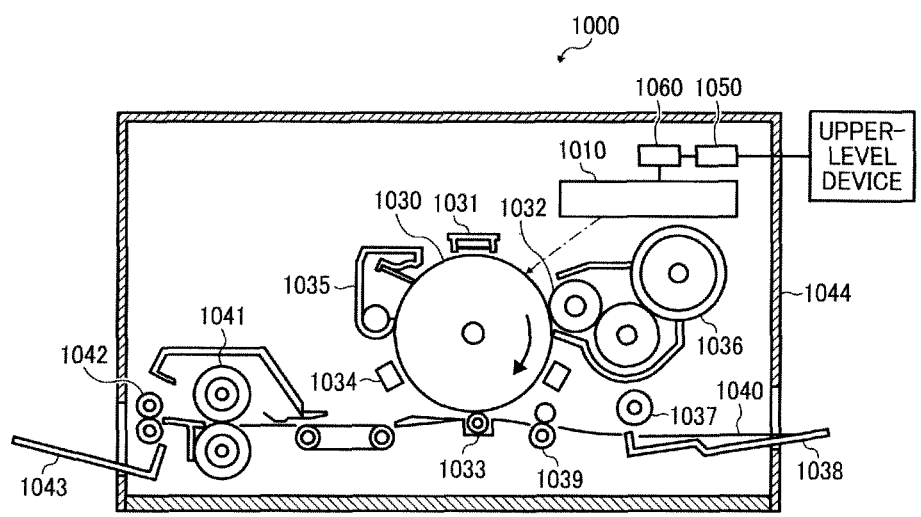
FIG. 1 is a diagram for explaining a general configuration of a laser printer according to an embodiment of the present invention.

Exemplary embodiments of the present invention are explained in detail below with reference to FIGS. 1 to 22. FIG. 1 is a schematic diagram of a laser printer 1000 as an image forming apparatus according to an embodiment of the present invention.

The laser printer 1000 includes an optical scanning device 1010, a photosensitive element 1030, a charging unit 1031, a developing roller 1032, a transfer charging unit 1033, a neutralizing unit 1034, a cleaning unit 1035, a toner cartridge 1036, a sheet feeding roller 1037, a sheet feeding tray 1038, a pair of registration rollers 1039, a fixing roller 1041, a sheet discharging roller 1042, a catch tray 1043, a communication control device 1050, and a printer control device 1060 that controls above-mentioned each unit as a whole. These units are housed in respective predetermined positions in a printer housing 1044.

The communication control device 1050 controls a two-way communication with an upper-level device (such as a personal computer) through a network or the like.

The photosensitive element 1030 is a cylindrical member on which a photosensitive layer is formed. That is, the surface of the photosensitive element 1030 is a scanning surface. The photosensitive element 1030 rotates in a direction indicated by an arrow in FIG. 1.

The charging unit 1031, the developing roller 1032, the transfer charging unit 1033, the neutralizing unit 1034, and the cleaning unit 1035 are arranged near the surface of the photosensitive element 1030 in this order in a rotation direction of the photosensitive element 1030.

The charging unit 1031 uniformly charges the surface of the photosensitive element 1030.

The optical scanning device 1010 irradiates the surface of the photosensitive element 1030, which is charged by the charging unit 1031, with a light flux modulated based on image data from the upper-level device. With this, a latent image corresponding to the image data is formed on the surface of the photosensitive element 1030. The latent image formed on the surface of the photosensitive element 1030 moves in the direction of the developing roller 1032 accompanied with the rotation of the photosensitive element 1030. The configuration of the optical scanning device 1010 will be described later.

Toner is stored in the toner cartridge 1036, which is supplied to the developing roller 1032.

The developing roller 1032 causes the toner supplied from the toner cartridge 1036 to adhere to the latent image to visualize the latent image. The latent image with the toner adhered thereto (hereinafter, "the toner image") moves in the direction of the transfer charging unit 1033 accompanied with the rotation of the photosensitive element 1030.

Recording sheets 1040 are stored in the sheet feeding tray 1038, and the sheet feeding roller 1037 is arranged near the sheet feeding tray 1038. The sheet feeding roller 1037 picks up the recording sheets 1040 one by one from the sheet feeding tray 1038, and conveys the recording sheet 1040 to the registration rollers 1039. The registration rollers 1039 once hold the recording sheet 1040 picked up by the sheet feeding roller 1037, and convey the recording sheet 1040 to a nip between the photosensitive element 1030 and the transfer charging unit 1033 in accordance with the rotation of the photosensitive element 1030.

To electrically attract the toner on the surface of the photosensitive element 1030 to the recording sheet 1040, a voltage with reversed polarity to the toner is applied to the transfer charging unit 1033. With this voltage, the toner image on the surface of the photosensitive element 1030 is transferred onto the recording sheet 1040. The recording sheet 1040 onto which the toner image is transferred is sent to the fixing roller 1041.

With the fixing roller 1041, heat and pressure is applied to the recording sheet 1040, so that the toner is fixed to the recording sheet 1040. The recording sheet 1040 with the toner image fixed thereto is sent to the catch tray 1043 through the sheet discharging roller 1042 and stacked sequentially on the catch tray 1043.

The neutralizing unit 1034 neutralizes the surface of the photosensitive element 1030.

The cleaning unit 1035 removes the toner (residual toner) remaining on the surface of the photosensitive element 1030. The removed residual toner is to be reused. The surface of the photosensitive element 1030 from which the residual toner is removed returns again to the position opposed to the charging unit 1031.

Next, the configuration of the optical scanning device 1010 is explained.

Figure 2:
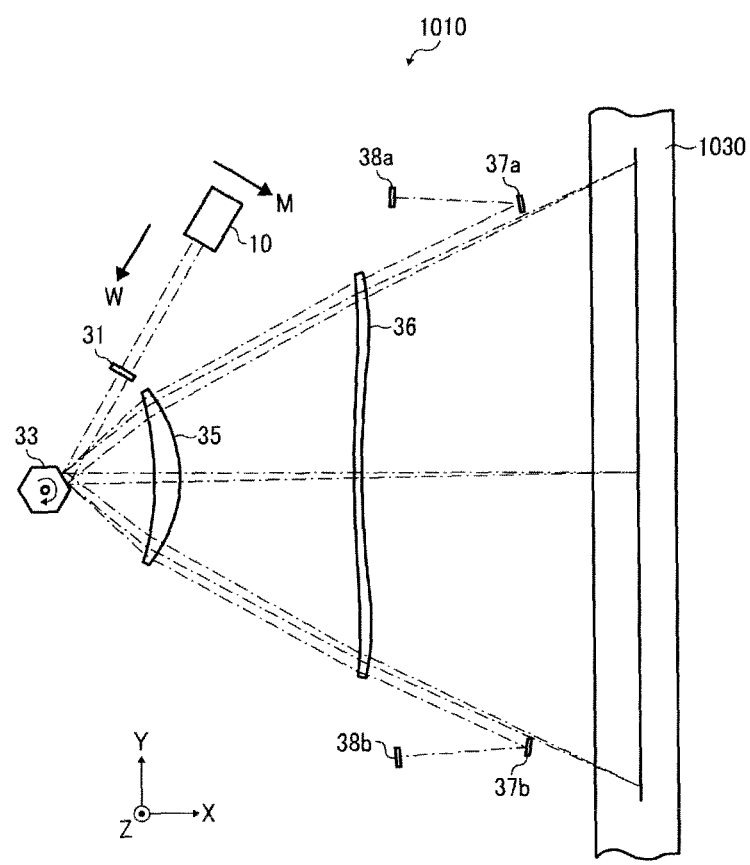
FIG. 2 is a schematic diagram illustrating an optical scanning device shown in FIG. 1.

As shown in FIG. 2 as an example, the optical scanning device 1010 includes a light source device 10, a cylindrical lens 31, a polygon mirror 33, a deflector-side scanning lens 35, an image-surface-side scanning lens 36, light detection mirrors 37a and 37b, and light detection sensors 38a and 38b. These units are assembled at respective predetermined positions inside an optical housing (not shown).

In addition, in the present specification, in the three dimensional xyz Cartesian coordinate system, a direction along the longitudinal direction of the photosensitive element 1030 is explained as the Y-axis direction and a direction along the optical axes of the scanning lenses 35 and 36 is explained as the X-axis direction. Moreover, hereinafter, a traveling direction of a light flux from the light source device 10 to the polygon mirror 33 is represented as "a W direction", and a direction perpendicular to both the Z-axis direction and the W direction is represented as "an M direction" as a matter of convenience.

Furthermore, hereinafter, a direction corresponding to a main-scanning direction is referred to as "a main-scanning corresponding direction", and a direction corresponding to a sub-scanning direction is referred to as "a sub-scanning corresponding direction" as a matter of convenience.

Figure 3:
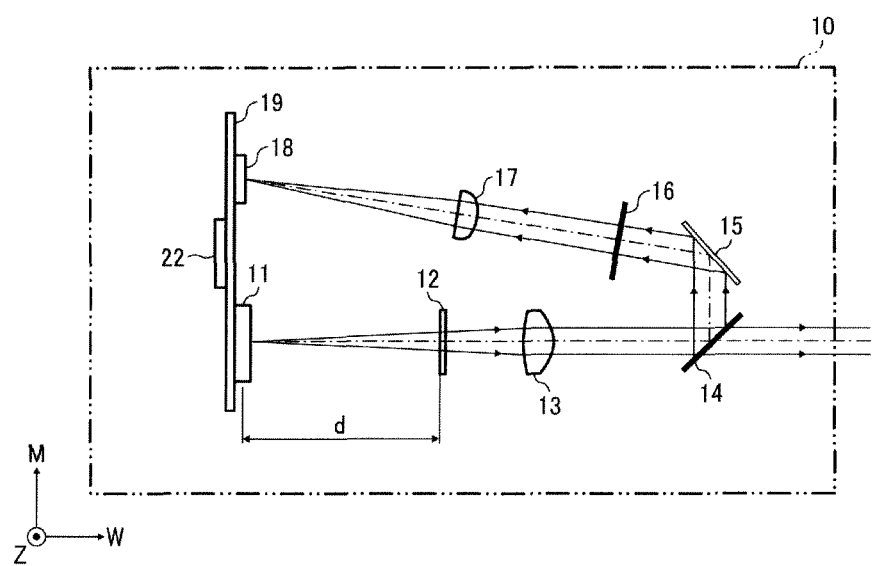
FIG. 3 is a diagram for explaining a light source device shown in FIG. 2.

As shown in FIG. 3 as an example, the light source device 10 includes a light source 11, a parallel plate 12, a coupling lens 13, a first aperture plate 14, a monitor-light reflecting mirror 15, a second aperture plate 16, a focusing lens 17, a light receiving element 18, and a light source control device 22. The light source 11, the light receiving element 18, and the light source control device 22 are mounted on the same circuit board 19. In the light source device 10, the main-scanning corresponding direction is a direction parallel to the M direction, and the sub-scanning corresponding direction is a direction parallel to the Z-axis direction.

Figure 4:
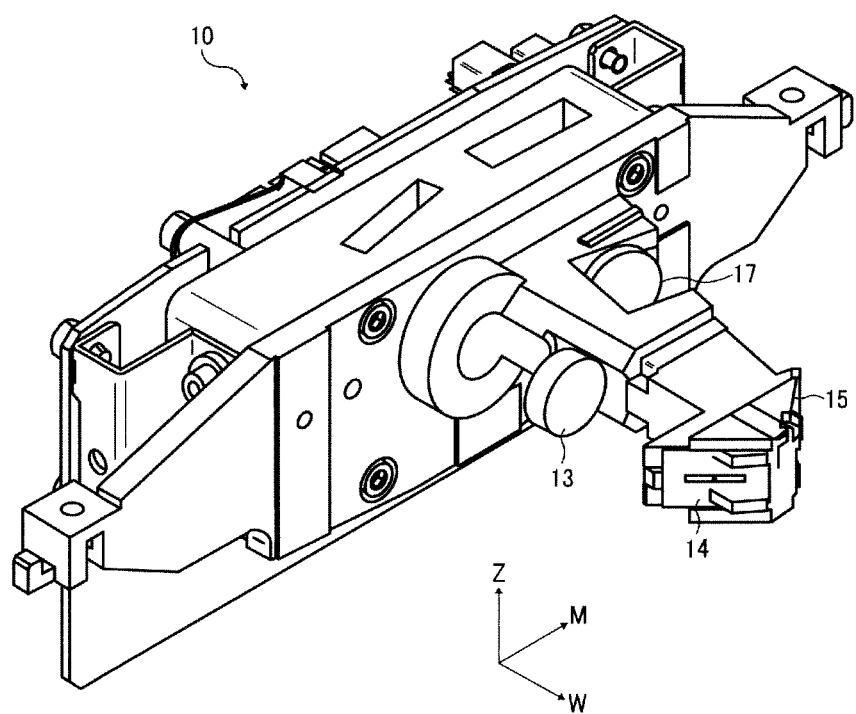
FIG. 4 is an external view of the light source device shown in FIG. 2.

An example of the external appearance of the light source device 10 is shown in FIG. 4.

Figure 5:
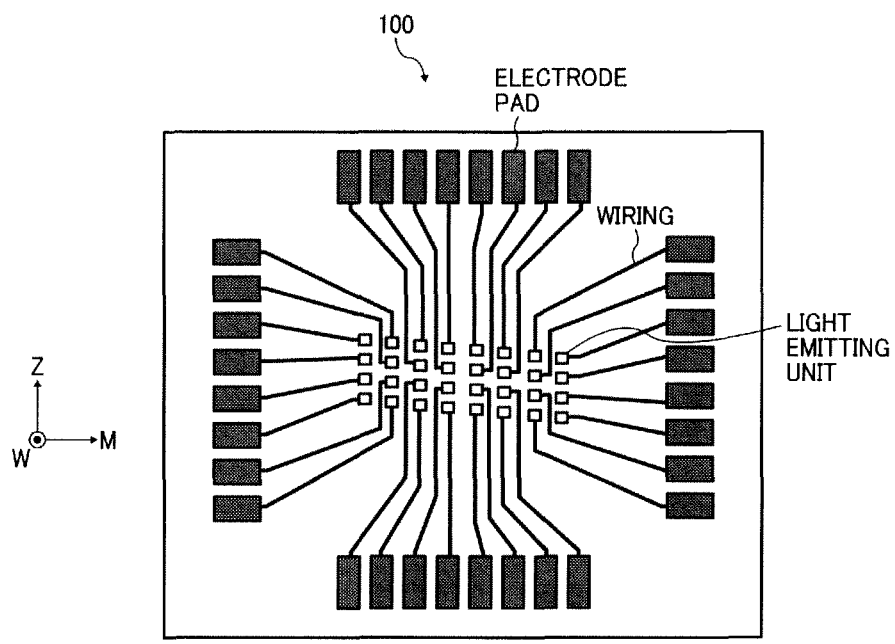
FIG. 5 is a diagram for explaining a laser chip.

As shown in FIG. 5 as an example, the light source 11 includes a laser chip 100.

The laser chip 100 includes 32 light emitting units that are arrayed two-dimensionally in the approximate center of a substrate. Furthermore, electrode pads corresponding to the respective light emitting units are formed on the periphery of the substrate. Each electrode pad is electrically connected to a corresponding light emitting unit with a wiring member.

Figure 6:
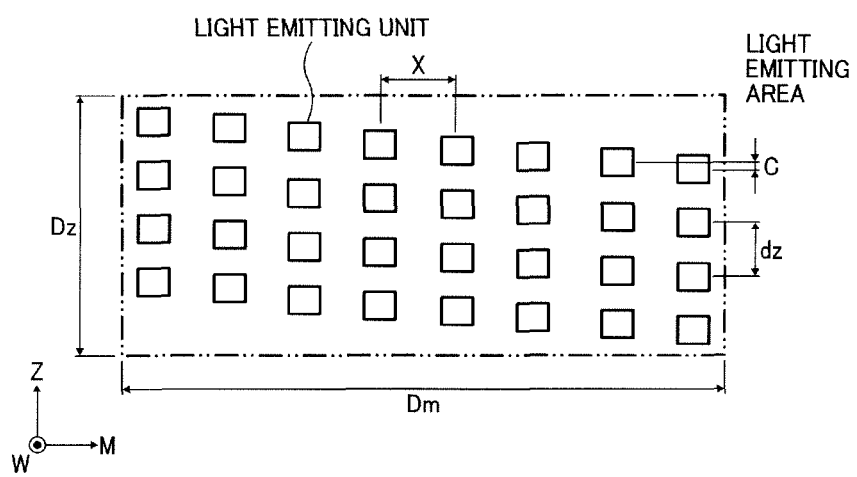
FIG. 6 is a diagram for explaining a plurality of light emitting units of the laser chip.

As shown in FIG. 6, the 32 light emitting units are arranged so that intervals between each light emitting units ("c" in FIG. 6) are kept constant when all the light emitting units are orthogonally projected on virtual lines stretching in the Z-axis direction. In the present specification, "light emitting unit interval" means the center-to-center distance between two light emitting units. In the embodiment, $c=2.3$ μm for example. Furthermore, the light emitting unit interval in the M direction (X in FIG. 6) is 30 μm, and the light emitting unit interval in the Z-axis direction (dZ in FIG. 6) is 18.4 μm A rectangular area containing the 32 light emitting units is also referred to as a light emitting area. In the embodiment, a length Dm of the light emitting area in the M direction is set so that $Dm=210$ μm, and a length Dz in the Z-axis direction is set so that $Dz=71.3$ μm.

Each light emitting unit is a VCSEL with a design oscillation wavelength of 780 nm band. That is, the laser chip 100 is a surface emitting laser array chip.

A light flux emitted from each light emitting unit is linearly polarized in a polarization direction that is parallel to the sub-scanning corresponding direction. Furthermore, a divergence angle (FFP) of the light flux emitted from each light emitting unit in a steady state (a state in which the optical output is stable) is 7 degrees (deg) in both the main-scanning corresponding direction and the sub-scanning corresponding direction.

Figure 7A:
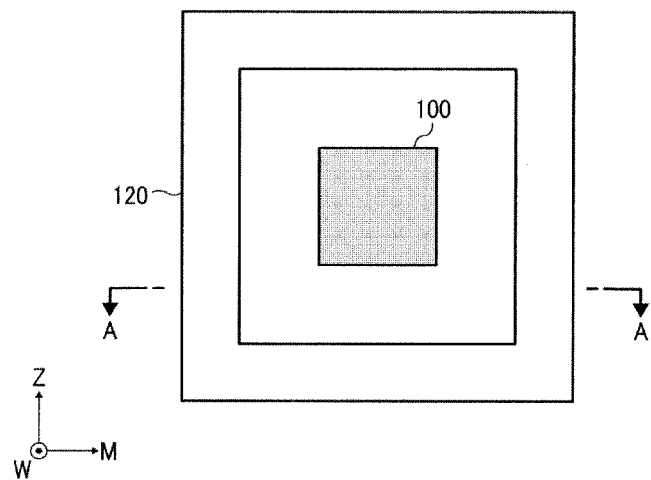
FIGS. 7A and 7B are diagrams for explaining a package unit.
Figure 7B:
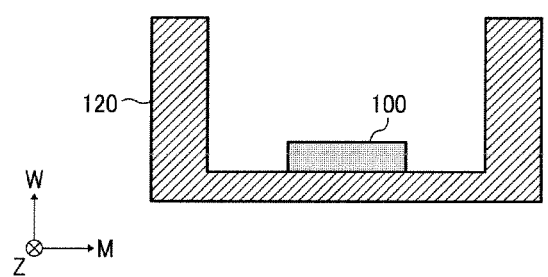

As illustrated in FIG. 7A and FIG. 7B which is a cross-sectional view taken along a line A-A of FIG. 7A, the laser chip 100 is held by a package unit 120 so as to be mounted on the circuit board 19. The laser chip 100 is not sealed in with a cover glass or the like.

The light source 11 is arranged so that a light flux is emitted toward the +W direction.

Referring back to FIG. 3, the parallel plate 12 is a parallel plate made of a transparent plastic or a transparent glass, and is arranged on the +W side of the light source 11. A distance between an emitting surface of the laser chip 100 and an incident surface of the parallel plate 12 is represented by "d".

The coupling lens 13 converts the light flux that has passed through the parallel plate 12 into an approximately parallel light.

Figure 8:
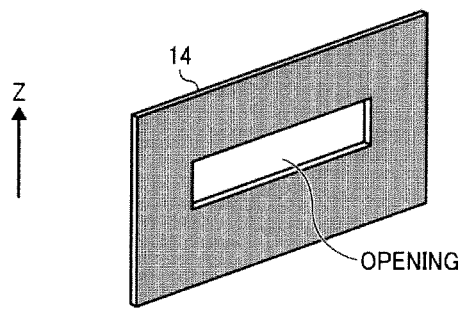
FIG. 8 is a diagram for explaining a first aperture plate.

As shown in FIG. 8 as an example, the first aperture plate 14 has an opening and shapes the light flux that has passed through the coupling lens 13. In the embodiment, the first aperture plate 14 is arranged so that a part of the light flux at the maximum intensity among the light flux that has passed through the coupling lens 13 can pass through the approximate center of the opening. Furthermore, the periphery of the opening of the first aperture plate 14 is made of a reflective member having a high reflectance.

Furthermore, the first aperture plate 14 is inclined with respect to a virtual surface perpendicular to an optical axis of the coupling lens 13 so that the light flux reflected by the reflective member on the periphery of the opening can be used as a monitor light flux.

The light flux that has passed through the first aperture plate 14 is a light flux to be emitted from the light source device 10.

Referring back to FIG. 3, the monitor-light reflecting mirror 15 changes a direction of the optical path of the light flux (monitor light flux) reflected by the reflective member of the first aperture plate 14 so that the optical path reaches the light receiving element 18.

The second aperture plate 16 defines the beam diameter of the monitor light flux reflected by the monitor-light reflecting mirror 15. The size and the shape of an opening of the second aperture plate 16 is determined depending on the size and the shape of the opening of the first aperture plate 14.

The focusing lens 17 focuses the monitor light flux that has passed through the opening of the second aperture plate 16.

The light receiving element 18 receives the monitor light flux. The light receiving element 18 outputs a signal (a photoelectric conversion signal) corresponding to the amount of the received light.

An optical system arranged on the light path of the monitor light flux between the first aperture plate 14 and the light receiving element 18 is also referred to as a monitor optical system. In the embodiment, the monitor optical system includes the monitor-light reflecting mirror 15, the second aperture plate 16, and the focusing lens 17.

Figure 9:
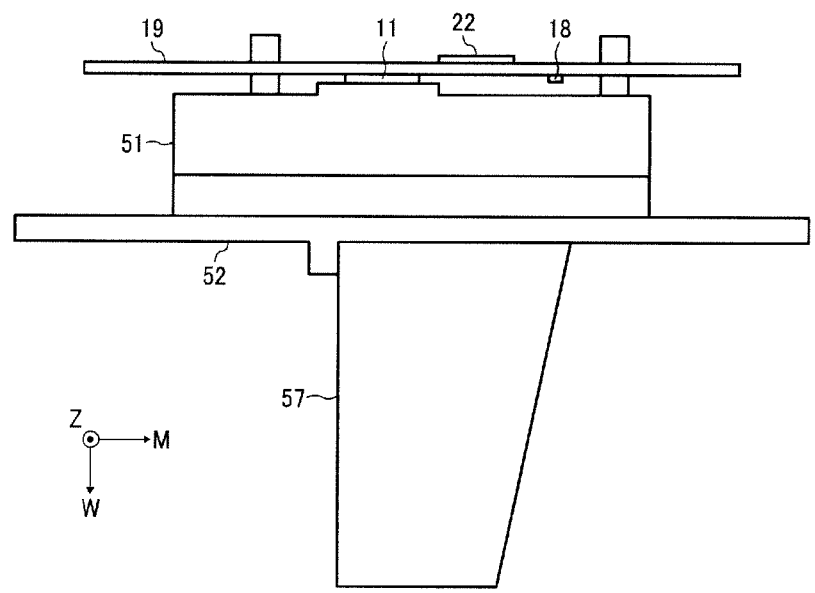
FIG. 9 is a diagram for explaining a holding unit of the light source device.

As schematically shown in FIG. 9, the light source device 10 also includes a first holding unit 51, a second holding unit 52, and a dustproof cover 57.

Figure 10:
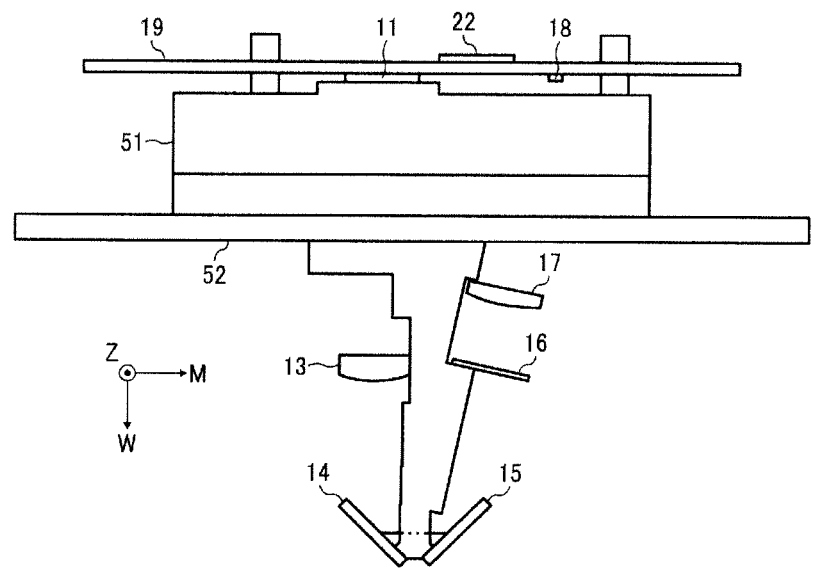
FIG. 10 is a diagram for further explaining the holding unit of the light source device.

As shown in FIG. 10, the coupling lens 13, the first aperture plate 14, the monitor-light reflecting mirror 15, the second aperture plate 16, and the focusing lens 17 are held in predetermined relative positions on the second holding unit 52.

On the first holding unit 51, the circuit board 19 is fixed on the −W side so that the light source 11 and the coupling lens 13 are arranged in predetermined relative positions, and the second holding unit 52 is fixed on the +W side.

Each of the first holding unit 51 and the second holding unit 52 has a through hole through which the light flux from the light source 11 passes, and a through hole through which the light flux toward the light receiving element 18 passes.

Figure 11:
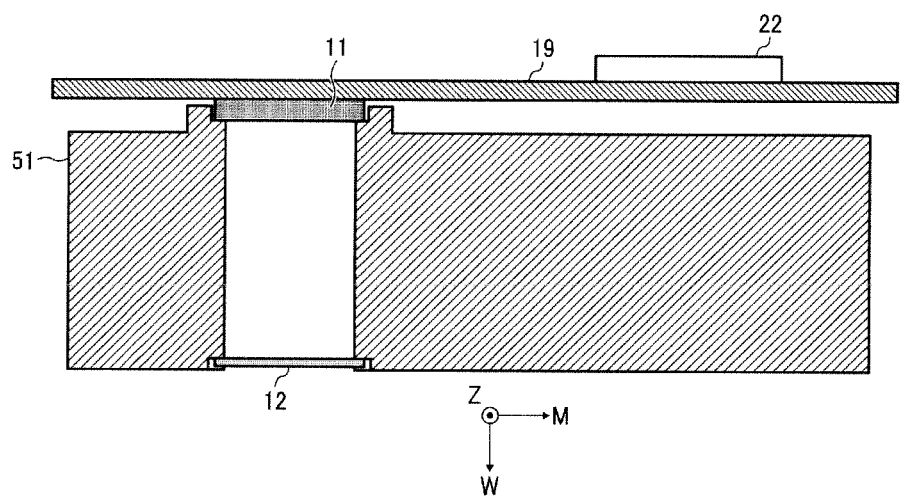
FIG. 11 is a diagram for explaining a through hole of a first holding unit.
Figure 12:
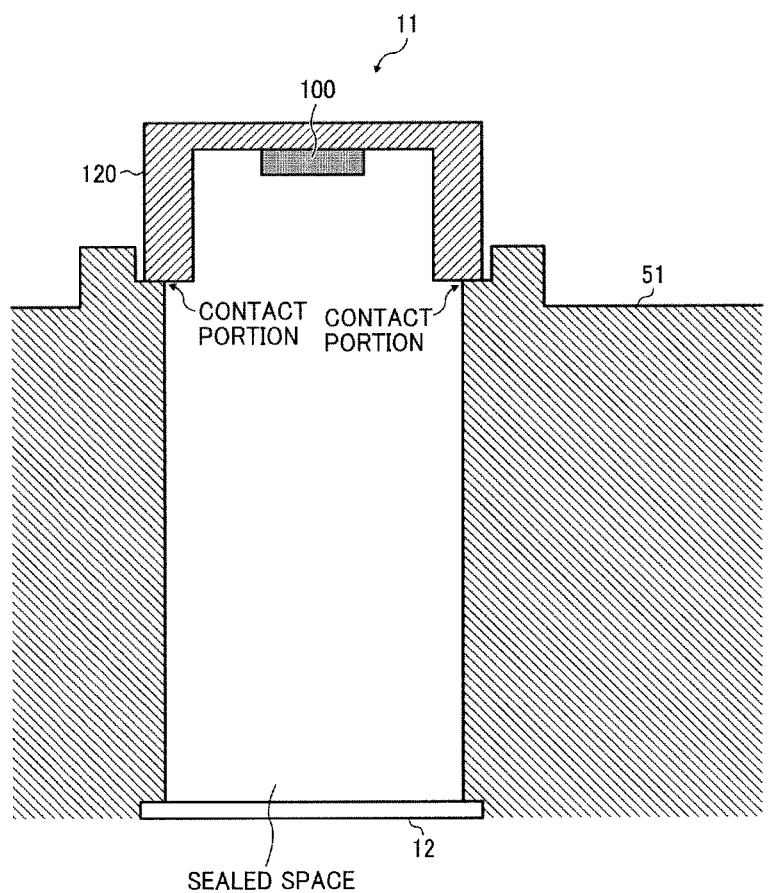
FIG. 12 is a diagram for explaining a sealed space of the through hole of the first holding unit.

As shown in FIG. 11 as an example, an end on the −W side of the through hole through which the light flux from the light source 11 passes in the first holding unit 51 has a stepped structure, and the surface of the package unit 120 is brought into contact with the stepped portion (see FIG. 12). Therefore, it is possible to prevent external dust or external dirt from coming into the through hole via the end on the −W side of the through hole.

Furthermore, an end on the +W side of the through hole through which the light flux from the light source 11 passes in the first holding unit 51 also has a stepped structure, and the parallel plate 12 is bonded to the stepped portion.

Therefore, the laser chip 100 is sealed in with the package unit 120, the first holding unit 51, and the parallel plate 12 (see FIG. 12). That is, it is possible to ensure the environmental resistance of the laser chip 100 even without the conventional cover glass.

The dustproof cover 57 is a cover that covers the coupling lens 13, the first aperture plate 14, the monitor-light reflecting mirror 15, the second aperture plate 16, and the focusing lens 17 for protecting them from being covered with dust or dirt. The dustproof cover 57 has an opening through which the light flux that has passed through the opening of the first aperture plate 14 passes.

Meanwhile, in the conventional VCSEL light source, because the VCSEL element is sealed in by using a lid (a lid of the package) made of a translucent material such as a glass or a sapphire, a light flux emitted from the VCSEL element is reflected by the incident surface of the lid of the package, and the reflected light enters the VCSEL element as optical feedback, resulting in causing interference. More specifically, the VCSEL is highly likely to cause the interference due to the optical feedback because it has a short resonance length and high coherency.

Therefore, the inventors carried out experiments about the stability of the light flux emitted from the laser chip 100 by changing a distance d between the emitting surface of the laser chip 100 and the incident surface of the parallel plate 12 and a reflectance R of the parallel plate 12. In the embodiment, $(E_1-E_2)/E_2 \times 100(\%)$ is defined as D, where $E_1$ represents an optical energy obtained just after an electrical current is injected into the laser chip 100, and $E_2$ represents an optical energy stabilized after a lapse of a predetermined time t. Furthermore, T (° C.) represents a temperature of the light source 11. Moreover, P2 represents the amount of light of the light flux that has passed through the opening of the first aperture plate 14, and P3 represents the amount of light of the light flux that has reached the light receiving element 18. It is designed such that P2=P3.

Figure 13:
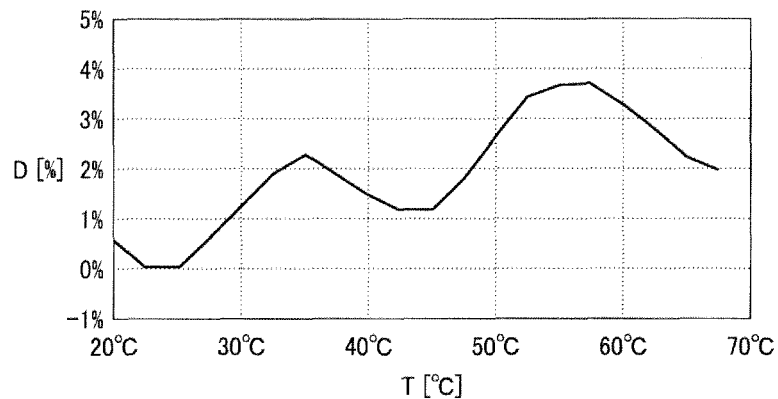
Figure 14:
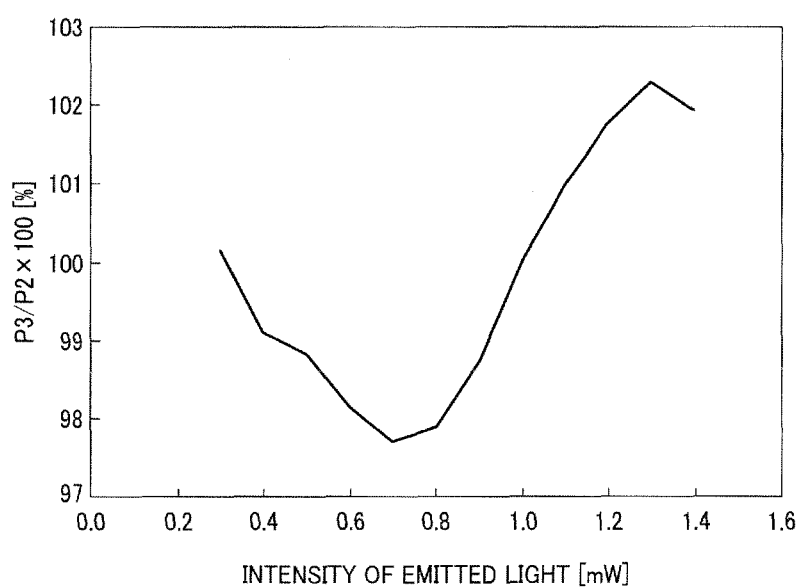

FIGS. 13 and 14 illustrate results obtained from a "sample a" in which d=0.3 mm and R=0.1%. In this case, as shown in FIG. 13, the linearity between D and T is largely lost. Furthermore, as shown in FIG. 14, P3/P2 largely fluctuates depending on the intensity of the emitted light. Therefore, it is determined that the interference due to the optical feedback has occurred in the sample a.

Figure 15:
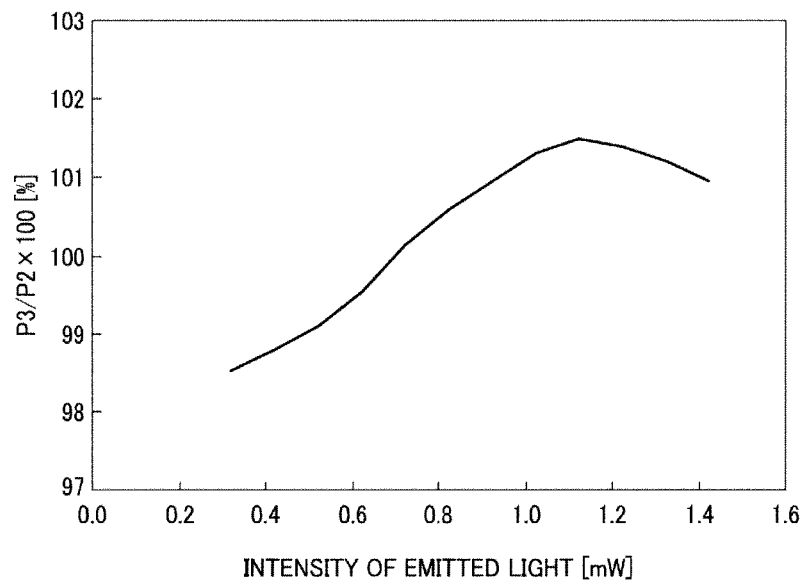
FIG. 15 is a diagram for explaining a relationship between P3/P2 and the intensity of an emitted light in a sample b.

FIG. 15 illustrates a result obtained from a "sample b" in which d=0.6 mm and R=0.7%. In this case as well, P3/P2 largely fluctuates depending on the intensity of the emitted light. Therefore, it is determined that the interference due to the optical feedback has occurred in the sample b.

Figure 16:
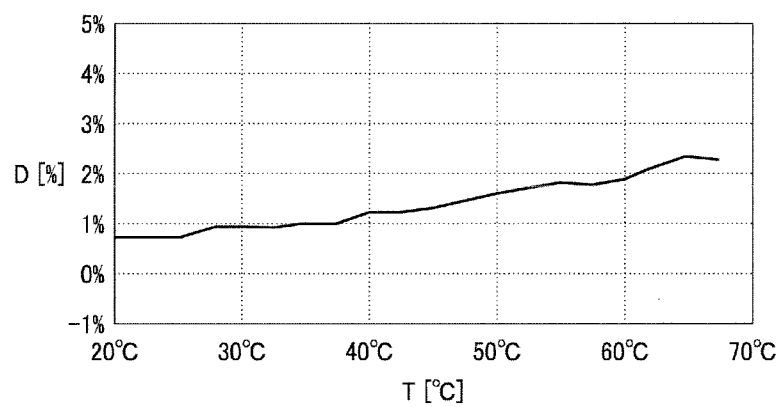
FIG. 16 is a diagram for explaining the temperature characteristics of D in a sample c.
Figure 17:
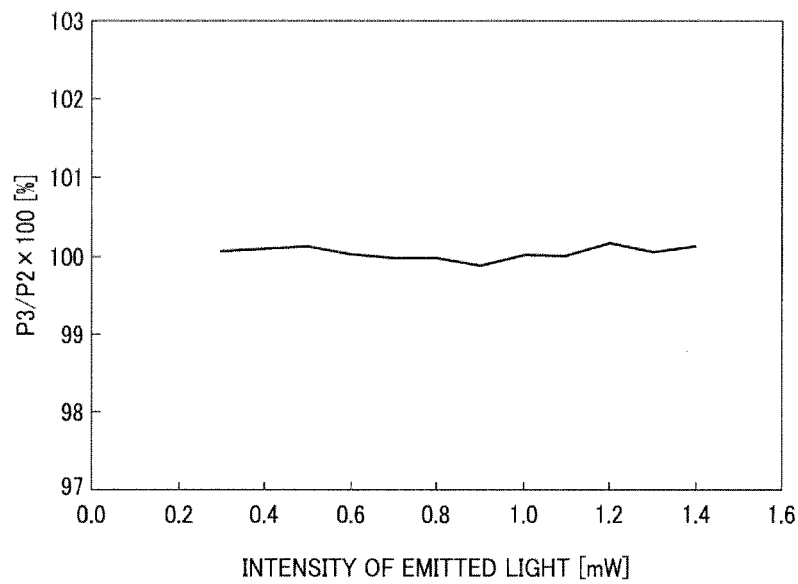
FIG. 17 is a diagram for explaining a relationship between P3/P2 and the intensity of an emitted light in the sample c.

FIGS. 16 and 17 illustrate results obtained from a "sample c" in which d=0.3 mm and R=0.05%. In this case, as shown in FIG. 16, D linearly changes according to the temperature of the light source 11. Furthermore, as shown in FIG. 17, P3/P2 is maintained almost constant regardless of the intensity of the emitted light. Therefore, it is determined that the interference due to the optical feedback has not occurred in the sample c.

In addition, $d/R^{1/2}$ was calculated for each sample. The value of $d/R^{1/2}$ was 0.9484 in the sample a, 0.7171 in the sample b, and 1.341 in the sample c.

Furthermore, a difference between a theoretical value (in this example, 100%) and an actual measurement value of P3/P2 when T=25° C. was calculated for each sample. The difference was 2.3% in the sample a, 1.5% in the sample b, and 0.2% in the sample c.

Figure 18:
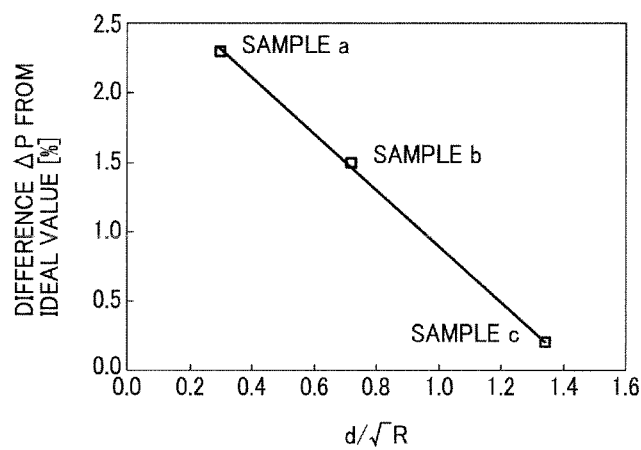
FIG. 18 is a diagram for explaining a relationship between a difference ΔP from an ideal value of P3/P2 and $d/R^{1/2}$.

With this condition, when each sample is plotted on a graph with the difference ΔP between the theoretical value and the actual measurement value of P3/P2 on the vertical axis and $d/R^{1/2}$ on the horizontal axis, the samples are approximated by a line as shown in FIG. 18. This line is represented by the following Equation (1).

$$\Delta P = -2.02 \cdot d/R^{1/2} + 2.92 \quad (1)$$

Figure 19:
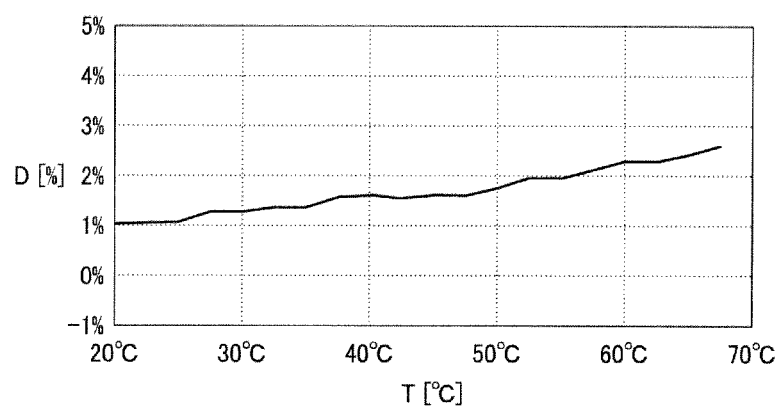
FIG. 19 is a diagram for explaining the temperature characteristics of D when a parallel plate of which R=0.1% is arranged at a position at which d=18 mm.
Figure 20:
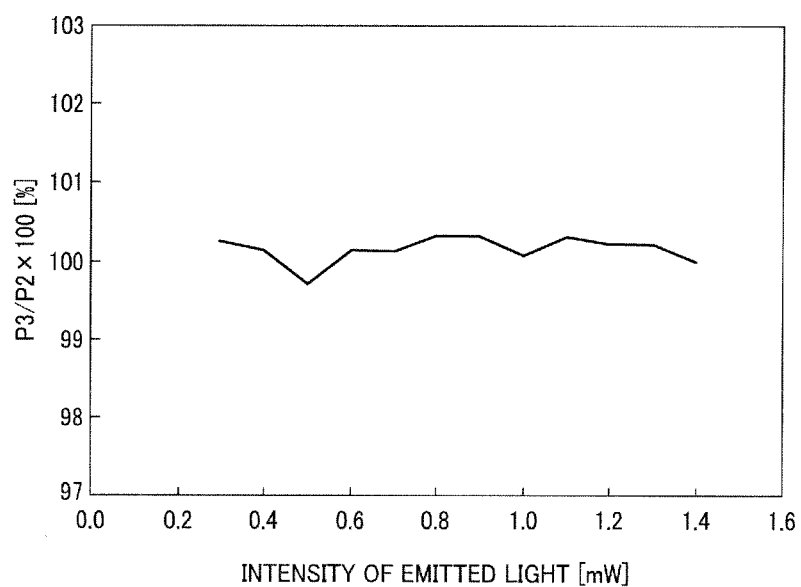
FIG. 20 is a diagram for explaining a relationship between P3/P2 and the intensity of an emitted light when a parallel plate of which R=0.1% is arranged at a position at d=18 mm.

Furthermore, FIGS. 19 and 20 illustrate results obtained when a parallel plate of which R=0.1% is arranged at a position at which d=18 mm and at which influence of the parallel plate can hardly be expected. In this case, as shown in FIG. 19, D linearly changes according to the temperature of the light source 11. Furthermore, as shown in FIG. 20, P3/P2 is maintained almost constant regardless of the intensity of the emitted light. Therefore, in this case, it is determined that the interference due to the optical feedback has not occurred as expected. Moreover, the difference ΔP between the theoretical value and the actual measurement value of P3/P2 was calculated to be 0.3%.

Therefore, it is assumed that when the difference ΔP between the theoretical value and the actual measurement value of P3/P2 is equal to or smaller than 0.3%, the interference due to the optical feedback can hardly occur.

Figure 21:
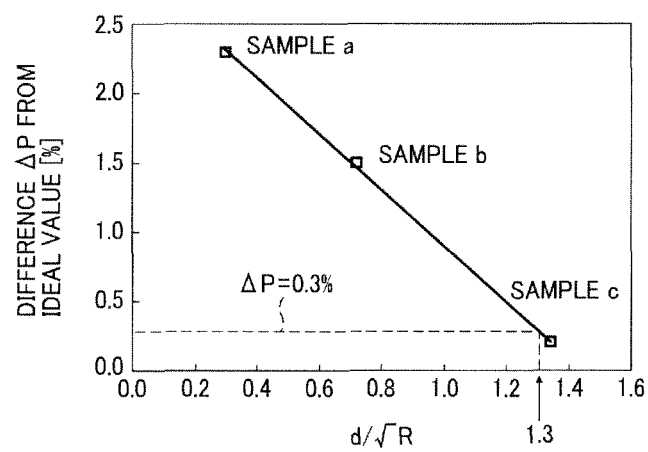
FIG. 21 is a diagram for explaining $d/R^{1/2}$ corresponding to ΔP=0.3%.

When 0.3% is assigned to ΔP in the above Equation (1), $d/R^{1/2}$ results in 1.3 (see FIG. 21). That is, when $d/R^{1/2}$ is equal to or greater than 1.3, the interference due to the optical feedback can hardly occur even when the parallel plate is arranged.

In the embodiment, a parallel plate of which R=0.1% is arranged at a position at which d=0.45 mm.

Referring back to FIG. 2, the cylindrical lens 31 focuses the light flux that has passed through the opening of the first aperture plate 14 of the light source device 10, i.e., the light flux emitted from the light source device 10, near the deflection reflection surface of the polygon mirror 33 with respect to the Z-axis direction.

An optical system arranged on the light path between the light source 11 and the polygon mirror 33 is also referred to as a pre-deflector optical system. In the embodiment, the pre-deflector optical system includes the parallel plate 12, the coupling lens 13, the first aperture plate 14, and the cylindrical lens 31.

The polygon mirror 33 has six plane mirrors of which inscribed circle has a radius of 25 mm for example, and each mirror becomes a deflection reflection surface. The polygon mirror 33 rotates at a constant speed around an axis parallel to the Z-axis direction, and deflects the light flux from the cylindrical lens 31.

The deflector-side scanning lens 35 is arranged on the light path of the light flux that is deflected by the polygon mirror 33.

The image-surface-side scanning lens 36 is arranged on the light path of the light flux through the deflector-side scanning lens 35. In addition, the light flux that has passed through the image-surface-side scanning lens 36 is applied to the surface of the photosensitive element 1030 to form a light spot. This light spot moves to the longitudinal direction of the photosensitive element 1030 accompanied with the rotation of the polygon mirror 33. That is, the light spot scans the photosensitive element 1030. On this occasion, the moving direction of the light spot is the "main-scanning direction" and the rotating direction of the photosensitive element 1030 is the "sub-scanning direction".

An optical system arranged on the light path between the polygon mirror 33 and the photosensitive element 1030 is also referred to as a scanning optical system. In the embodiment, the scanning optical system includes the deflector-side scanning lens 35 and the image-surface-side scanning lens 36. It is possible to arrange at least one reflecting mirror in at least one side on the light path between the deflector-side scanning lens 35 and the image-surface-side scanning lens 36, and on the light path between the image-surface-side scanning lens 36 and the photosensitive element 1030.

A part of the light flux before writing among the light flux that is deflected by the polygon mirror 33 and passes through the scanning optical system enters the light detection sensor 38a through the light detection mirror 37a. In addition, a part of the light flux after writing among the light flux that is deflected by the polygon mirror 33 and passes through the scanning optical system enters the light detection sensor 38b through the light detection mirror 37b.

Each light detection sensor outputs a signal (photoelectric conversion signal) corresponding to the amount of the received light.

Figure 22:
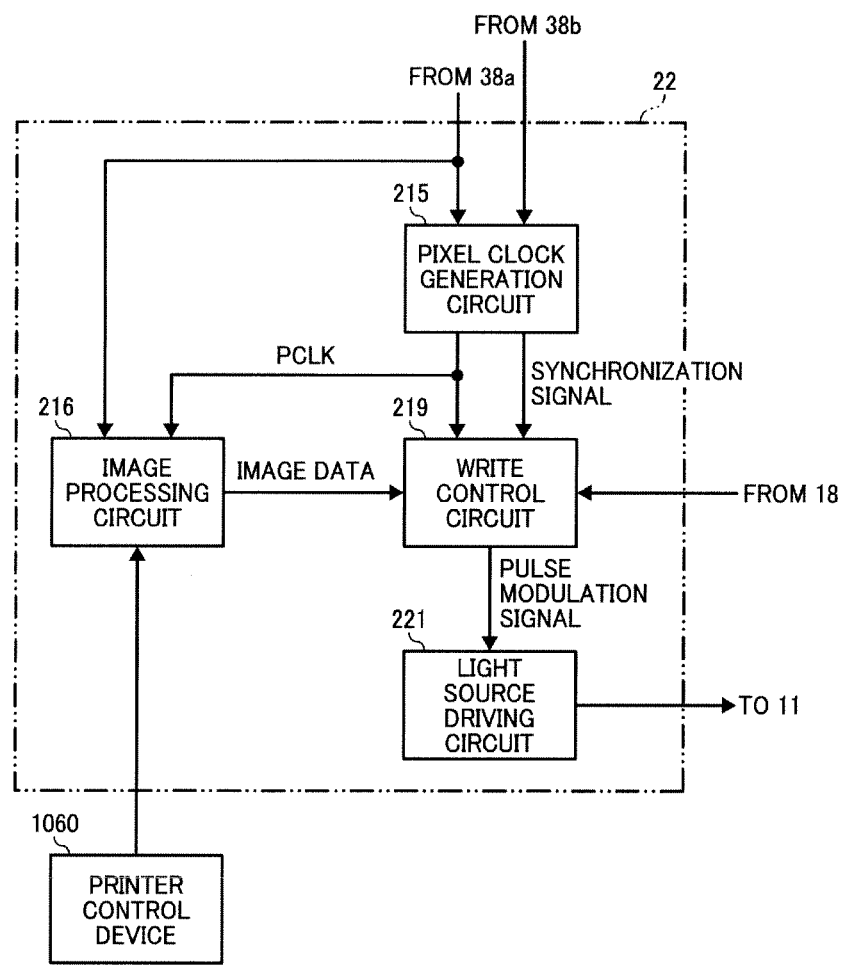
FIG. 22 is a diagram for explaining a light source control device.

The light source control device 22 includes, as shown in FIG. 22 as an example, a pixel clock generation circuit 215, an image processing circuit 216, a write control circuit 219, and a light source driving circuit 221. In addition, arrows in FIG. 22 represent the flows of typical signals and information, and do not represent all the connection relationships among blocks.

The pixel clock generation circuit 215 obtains the time that is needed for a light flux to scan between the light detection sensors 38a and 38b based on the output signal of the light detection sensor 38a and the output signal of the light detection sensor 38b, sets a frequency so that the predetermined number of pulses falls within the time, and generates a pixel clock signal PCLK of the frequency. The generated pixel clock signal PCLK is supplied to the image processing circuit 216 and the write control circuit 219. In addition, the output signal of the light detection sensor 38a is supplied to the write control circuit 219 as a synchronization signal.

The image processing circuit 216 rasterizes the image information received from the upper-level device through the printer control device 1060 and performs a predetermined halftone processing. Thereafter, the image processing circuit 216 generates image data that expresses each pixel tone with the pixel clock signal PCLK as a reference for each light emitting unit. In addition, the image processing circuit 216 outputs the image data to the write control circuit 219 in synchronization with the pixel clock signal PCLK when it detects the start of scanning based on the light detection sensor 38a.

The write control circuit 219 generates a pulse modulation signal based on the image data from the image processing circuit 216, and the pixel clock signal PCLK and the synchronization signal from the pixel clock generation circuit 215. Furthermore, the write control circuit 219 corrects a drive current of each light emitting unit at a predetermined timing so that the amount of light of the light flux that passes through the opening of the first aperture plate 14 of the light source device 10 becomes a desired value, based on the output signal from the light receiving element 18. That is, the write control circuit 219 performs APC (Auto Power Control).

The light source driving circuit 221 drives each light emitting unit of the laser chip 100 based on the pulse modulation signal from the write control circuit 219.

As described above, the light source device 10 according to the embodiment includes the laser chip 100 as the VCSEL array, the package unit 120 on which the laser chip 100 is mounted, the parallel plate 12, the coupling lens 13, the first aperture plate 14, the first holding unit 51, the second holding unit 52, the monitor optical system, the light receiving element 18, and the light source control device 22.

Furthermore, the package unit 120 is brought into contact with the end on the −W side of the first holding unit 51, and the parallel plate 12 is fixedly bonded to the end on the +W side of the first holding unit 51. Therefore, the laser chip 100 is sealed in with the package unit 120, the first holding unit 51, and the parallel plate 12. As a result, it is possible to ensure the environmental resistance of the laser chip 100 even without the conventional cover glass.

Furthermore, a relational expression $d/R^{1/2} \geq 1.3$ is satisfied where d (mm) is the distance between the emitting surface of the laser chip 100 and the surface of the parallel plate 12 into which the light flux enters, and R (%) is the reflectance of the surface of the parallel plate 12 into which the light flux enters.

In this case, it is possible to prevent the interference due to the optical feedback by the parallel plate 12 with respect to the light flux emitted from the laser chip 100.

Therefore, the light source control device 22 can stably and precisely detect change in the amount of light of the light flux emitted from the laser chip 100 based on the output signal from the light receiving element 18. Furthermore, the light source control device 22 can perform control by the APC so that the light source device 10 emits the stable amount of light flux.

That is, the light source device 10 can emit the stabile amount of light without increasing costs.

Furthermore, because the optical scanning device 1010 according to the embodiment includes the light source device 10 that can emit the stable amount of light, it can stably perform optical scanning on the surface of the photosensitive element 1030.

Moreover, according to the laser printer 1000 of the embodiment, because it includes the optical scanning device 1010, it can form a high quality image.

In the embodiment described above, the light source device 10 can include a quarter-wave plate 55. In this case, even when the light flux emitted from the light source device 10 is reflected by a lens or the like and is returned to the light source 11, because the deflection direction of the returned light flux is shifted by 90° with respect to the deflection direction of the light flux emitted from the light source 11, it is possible to further prevent the interference.

Figure 23:
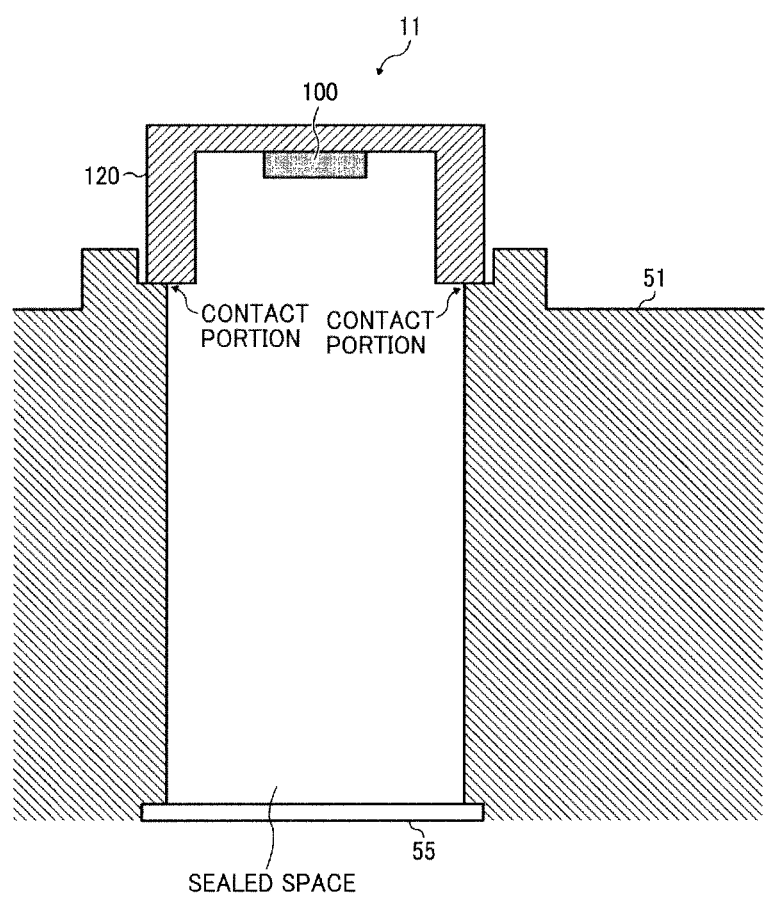
FIG. 23 is a diagram for explaining a sealed space of the through hole of the first holding unit when a quarter-wave plate is used instead of the parallel plate.
Figure 23:
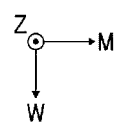

Conventionally, a parallel plate is necessary even when the quarter-wave plate is used. In contrast, in the embodiment described above, as shown in FIG. 23 as an example, it is possible to use the quarter-wave plate 55 instead of the parallel plate 12. In this case, the laser chip 100 is sealed in with the package unit 120, the first holding unit 51, and the quarter-wave plate 55. Therefore, because the parallel plate 12 is not needed, it is possible to further reduce the number of components and costs compared with the conventional technology.

Besides, when the relational expression $d/R^{1/2} \geq 1.3$ is satisfied for the distance d (mm) between the emitting surface of the laser chip 100 and the surface of the quarter-wave plate 55 into which the light flux enters and the reflectance R (%) of the surface of the quarter-wave plate 55 into which the light flux enters, it is possible to prevent the interference due to the optical feedback by the quarter-wave plate 55 with respect to the light flux emitted from the laser chip 100.

Furthermore, in the embodiment described above, an example is explained in which the holding unit is formed of the first holding unit 51 and the second holding unit 52. However, the present invention is not limited to this example. For example, the first holding unit 51 and the second holding unit 52 may be integrated with each other. Also, the holding unit may be formed of three or more holding units.

Moreover, in the embodiment described above, an example is explained in which the laser chip 100 includes the 32 light emitting units. However, the present invention is not limited to this example.

Furthermore, in the embodiment described above, it is possible to use a laser chip in which a plurality of light emitting units are arrayed one-dimensionally instead of the laser chip 100.

Moreover, in the embodiment described above, an example is explained in which the light source 11 and the light receiving element 18 are mounted on the same circuit board 19. However, the present invention is not limited to this example. It is possible to mount the light source 11 and the light receiving element 18 on different circuit boards.

Moreover, in the embodiment described above, although the laser printer 1000 is used as the image forming apparatus, the present invention is not limited to this situation. In short, any image forming apparatus that includes the optical scanning device 1010 can be employed.

For example, it is possible to employ an image forming apparatus that directly applies the laser light to a medium (for example, a paper) which performs color formation by the laser light.

Furthermore, an image forming apparatus that uses a silver salt film as an image carrier may be employed. In this case, a latent image is formed on the silver salt film by optical scanning, and the latent image can be visualized by the processing similar to the developing process in the normal silver salt photography process. Furthermore, the image can be printed on a photographic paper by the processing similar to the printing process in the normal silver salt photography process. Such an image forming apparatus can be put into practice as an optical plate making apparatus or a photolithography apparatus that draws a computed tomography (CT) scan image or other similar images.

Figure 24:
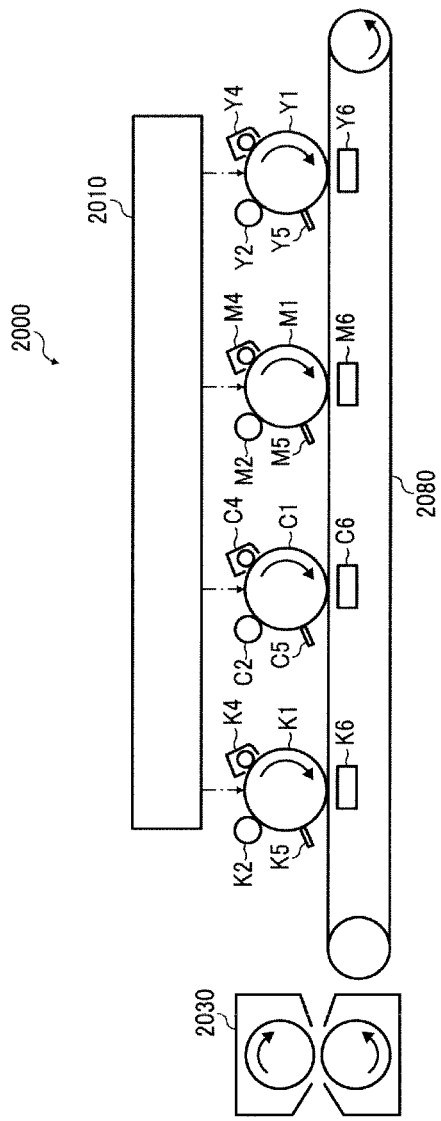
FIG. 24 is a diagram illustrating a general configuration of a color printer.

Moreover, the image forming apparatus can be a color printer 2000 that includes a plurality of photosensitive elements, for example, as shown in FIG. 24.

The color printer 2000 is a tandem type multi-color printer that forms a full-color image by superimposing four color toner images of black, cyan, magenta, and yellow. The color printer 2000 includes a photosensitive element K1, a charging unit K2, a developing unit K4, a cleaning unit K5, and a transferring unit K6 for black, a photosensitive element C1, a charging unit C2, a developing unit C4, a cleaning unit C5, and a transferring unit C6 for cyan, a photosensitive element M1, a charging unit M2, a developing unit M4, a cleaning unit M5, and a transferring unit M6 for magenta, a photosensitive element Y1, a charging unit Y2, a developing unit Y4, a cleaning unit Y5, and a transferring unit Y6 for yellow, an optical scanning device 2010, a transferring belt 2080, and a fixing unit 2030.

Around each photosensitive element that rotates in a direction indicated by an arrow shown in FIG. 24, a charging unit, a developing unit, a transferring unit, and a cleaning unit are arranged. Each charging unit uniformly charges the surface of the corresponding photosensitive element. The optical scanning device 2010 irradiates the uniformly-charged surface of each photosensitive element with light to form a latent image thereon. Then, the developing unit forms a toner image on the surface of each photosensitive element. Each toner image is transferred onto a recording sheet by the transferring unit, and finally the full-color image is fixed on the recording sheet by the fixing unit 2030.

The optical scanning device 2010 includes light source devices similar to the light source device 10 for the respective colors. Therefore, it is possible to achieve the same advantages as those of the optical scanning device 1010.

Furthermore, the color printer 2000 can achieve the same advantages as those of the laser printer 1000.

In the tandem type multi-color printer, a color shift between colors sometimes occurs due to a decrease in machine accuracy or the like. However, it is possible to increase correction accuracy for the color shift between colors by selecting a light emitting unit to be turned on.

In addition, in the color printer 2000, it is possible to arrange the optical scanning devices for each color or for every two colors.

According to an aspect of the present invention, the light source device makes it possible to stably perform optical scanning.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source device comprising:
    a surface emitting laser;
    a surface emitting laser holding unit on which the surface emitting laser is mounted;
    a parallel plate that is arranged on a light path of a light flux from the surface emitting laser so that the light flux enters into one surface thereof, and that is made of a transparent material;
    a holder having a through hole that functions as a light path of the light flux from the surface emitting laser; and
    a coupling lens that collects a light flux that has passed through the parallel plate, and is held by the holder, wherein
    the surface emitting laser holding unit is brought into contact with the holder,
    the parallel plate is fixedly bonded to the holder, and
    a part of the through hole of the holder is sealed with the surface emitting laser holding unit and the parallel plate.

2. The light source device according to claim 1,
    wherein the coupling lens converts the light flux that has passed through the parallel plate into an approximately parallel light.

3. The light source device according to claim 2, further comprising:
    an aperture unit that has an opening, is arranged to allow a part of a light flux at a maximum intensity among the light flux that has passed through the coupling lens to pass through an approximate center of the opening, and reflects a light flux that has entered a periphery of the opening for use as a monitor light flux; and
    a light detecting unit that receives the monitor light flux that has been reflected by the aperture unit.

4. An image forming apparatus comprising:
    at least one image carrier; and
    at least one optical scanning device that scans a scanning surface with a light flux, the optical scanning device comprising
        the light source of claim 1,
        a deflector that deflects the light flux emitted from the light source device; and
        a scanning optical system that focuses the light flux deflected by the deflector onto the scanning surface,
    wherein the optical scanning device scans the image carrier with a light flux modulated based on image information.

5. The image forming apparatus according to claim 4, wherein the image information Is information on a multi-color image.

6. A light source device comprising:
    a surface emitting laser;
    a surface emitting laser holding unit on which the surface emitting laser is mounted;

a parallel plate that is arranged on a light path of a light flux from the surface emitting laser so that the light flux enters into one surface thereof, and that is made of a transparent material; and a holder having a through hole that functions as a light path of the light flux from the surface emitting laser, wherein the surface emitting laser holding unit is brought into contact with the holder, the parallel plate is fixedly bonded to the holder, and a part of the through hole of the holder is sealed with the surface emitting holding unit and the parallel plate, and wherein $d/R^{1/2} \geq 1.3$ is satisfied, where R is a reflectance (%) of an incident surface of the parallel plate into which the light flux from the surface emitting laser enters, and d is a distance (mm) from an emitting surface of the surface emitting laser to the incident surface of the parallel plate.

7. A light source device comprising:
a surface emitting laser;
a surface emitting laser holding unit on which the surface emitting laser is mounted;
a quarter-wave plate that is arranged on a light path of a light flux from the surface emitting laser so that the light flux enters one surface thereof; and
a holder having a through hole that functions as a light path of the light flux from the surface emitting laser, wherein
the surface emitting laser holding unit is brought into contact with the holder,
the quarter-wave plate is fixedly bonded to the holder, and
a part of the through hole of the holder is sealed with the surface emitting laser holding unit and the quarter-wave plate, and wherein $d/R^{1/2} \geq 1.3$ is satisfied, where R is a reflectance (%) of an incident surface of the quarter-wave plate into which the light flux from the surface emitting laser enters, and d is a distance (mm) from an emitting surface of the surface emitting laser to the incident surface of the quarter-wave plate.

8. The light source device according to claim 7, further comprising:
a coupling lens that converts a light flux that has passed through the quarter-wave plate into an approximately parallel light, and is held by the holder.

9. The light source device according to claim 8, further comprising:
an aperture unit that has an opening, is arranged to allow a part of a light flux at a maximum intensity among the light flux that has passed through the coupling lens to pass through an approximate center of the opening, and reflects a light flux that has entered a periphery of the opening for use as a monitor light flux; and
a light detecting unit that receives the monitor light flux that has been reflected by the aperture unit.

10. An image forming apparatus comprising:
at least one image carrier; and
at least one optical scanning device that scans a scanning surface with a light flux, the optical scanning device comprising
the light source of claim 7,
a deflector that deflects the light flux emitted from the light source device; and
a scanning optical system that focuses the light flux deflected by the deflector onto the scanning surface,
wherein the optical scanning device scans the image carrier with a light flux modulated based on image information.

11. The image forming apparatus according to claim 10, wherein the image information is information on a multi-color image.

* * * * *